Patented Aug. 16, 1949

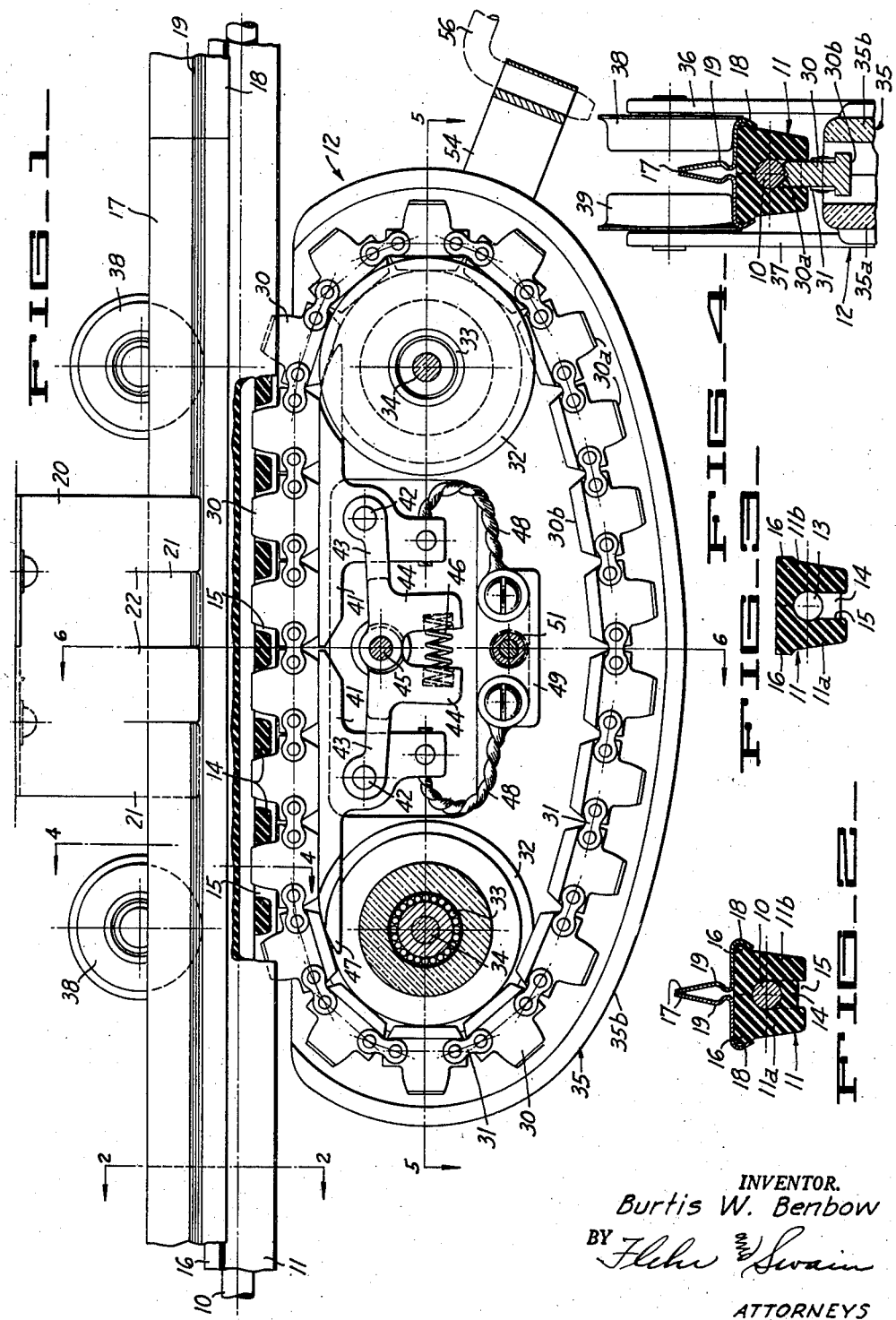

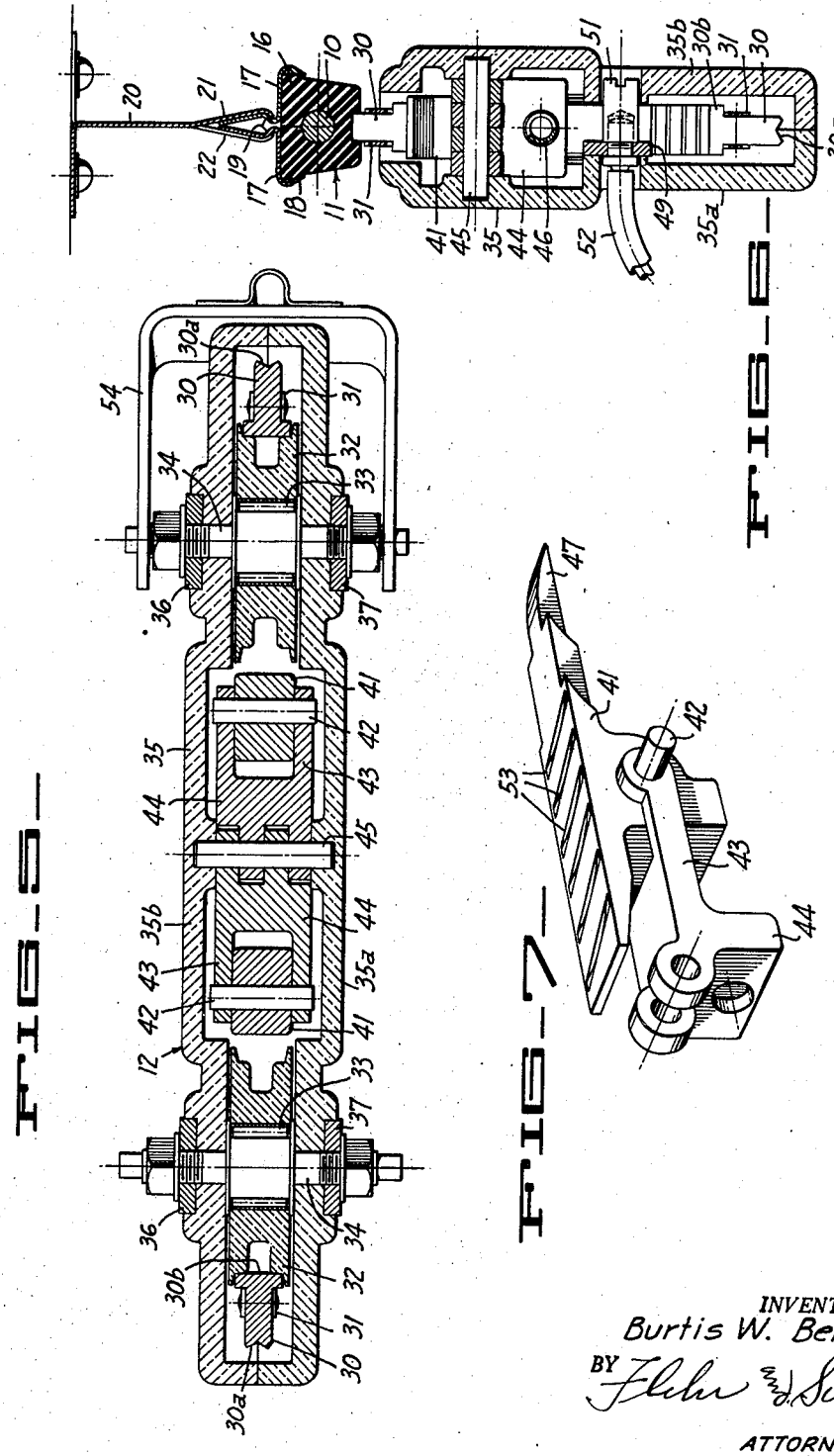

2,479,461

UNITED STATES PATENT OFFICE 2,479,461

ELECTRICAL CONTACTING EQUIPMENT

Burtis William Benbow, Benbow, Calif.

Original application January 31, 1944, Serial No. 520,399. Divided and this application April 1, 1948, Serial No. 18,472

2 Claims. (Cl. 191—59)

This invention relates generally to electrical equipment of the type making use of a traveling contacting device together with an extended electrical conductor or trolley wire. Such devices can be used advantageously where a trolley arrangement is desired to supply current to movable appliances like hoists and cranes, or even in some instances, portable hand tools. This application is a division of subject matter disclosed in my copending application Serial No. 520,399, filed January 31, 1944, now Patent No. 2,453,778, granted November 16, 1948, for "Electrical contacting equipment."

It is a general object of the invention to provide improved electrical equipment of the above character, and in particular to improve upon equipment of the type disclosed and claimed in my Patent No. 2,255,874, granted September 16, 1941.

In my aforesaid Patent 2,255,874 there is disclosed a novel form of traveling contacting device or collector box characterized by the use of a plurality of conductor teeth connected together by links in the form of an endless chain, and adapted to cooperate with a trolley conductor in such a fashion that a plurality of the conductor teeth engage the trolley wire at the same time. An object of the present invention is to provide an improved collector box of this type, and which in particular has improved means for urging a plurality of the conductor teeth against the trolley conductor, and for making electrical current connections to the same teeth.

Other objects of the invention will be apparent from the following description of a preferred embodiment thereof as illustrated in the accompanying drawing.

Referring to the drawing—

Figure 1 is a side elevational view partly in section showing electrical equipment incorporating my invention.

Figure 2 is a sectional view taken along the line 2—2 of Figure 1 showing the electrical conductor and its insulating sheath, and the mounting means therefor.

Figure 3 is a cross-sectional view of my electrical conductor and its insulating sheath.

Figure 4 is a cross-sectional view taken along the plane 4—4 of Figure 1 showing my traveling electrical contactor in cooperative relation with the electrical conductor and its mounting means.

Figure 5 is a cross-sectional view taken along the line 5—5 of Figure 1.

Figure 6 is a cross-sectional detail taken along the line 6—6 of Figure 1.

Figure 7 is a three-quarter side elevational view showing one of the two bus bar elements of my traveling electrical contactor.

It is possible to use my novel collector box with a trolley conductor and sheath of the type disclosed in my above mentioned Patent 2,255,874. However, the drawing illustrates another type of conductor assembly which is made the subject matter of my co-pending application Serial No. 18,471, filed simultaneously herewith, and which is likewise a division of my application Serial No. 520,399, filed January 31, 1944, and entitled "Electrical contacting equipment."

As disclosed the trolley conductor assembly comprises the trolley wires 10 enclosed by the insulating sheath 11, and which cooperates with my traveling electrical contacting device or collector box 12. In this instance the sheath is of molded resilient material such as natural or synthetic rubber. It is formed of two side body portions 11a and 11b (Figure 3), which have a longitudinal cavity 13 to receive the trolley conductor, and which are joined together by the spaced integral ribs 14. When viewed in section as in Figure 1 the end faces of these ribs are curved like the faces of epicyclic spur gear rack teeth.

As described in my aforesaid co-pending applications, the sheath is molded in a suitable machine, with a wire being used to form the recess 13. Upon removal of the sheath from the molding machine the back side of the body is split through to the recess 13, as shown in Figure 3, and the wire utilized for forming the recess 13 is then withdrawn. The sheath can now be readily applied over a trolley wire simply by pulling the body portions 11a and 11b apart, and forcing the same over the wire. To facilitate retention of the sheath within the mounting means to be presently described, the body portions 11a and 11b are preferably provided with longitudinally extending ridges or ribs 16.

The type of mounting means illustrated consists of a pair of retention strips 17, which can conveniently be formed of pressed sheet metal bent angle shaped as illustrated. The base portions of these strips are provided with turned edges 18 to engage about the longitudinal ridges 16. The adjacent wall portions 19 can be shaped as illustrated (Figure 2) whereby when these portions are urged together the turned edge portions 18 are forced into tight engagement with the ribs 16. Thus the two body portions 11a and 11b of this sheath are pressed together about the trolley wire, while at the same time the sheath together with the enclosed wire are adequately held by the strips 17. The complete assembly of strips 17 in effect a metal mounting which is substantially T-shaped in cross section.

Suitable mounting means can be used for holding this assembly upon structural members of a roof or ceiling. The arrangement shown uses brackets 20 which can each be in the form of a depending sheet metal plate. The lower portion of this plate is slit (Figure 1) to provide spring tabs 21 and 22, which are bent to clip over the adjacent wall portions 19 of the strips 17 (Figure 6). Thus strips 17 are held tightly together while at the same time these strips are adequately supported from a series of brackets 20. As will be presently explained when the assembly is supported in this manner the base portions of the strips 17 form trackways for wheels, which in turn serve to support the traveling contacting device.

The traveling contacting device or collector box 12 is similar to that disclosed in my Patent 2,255,874, to the extent that it employs a series of teeth-like conductor elements 30 which are connected together by suitable links 31, to form an endless chain. This chain-like assembly is trained about a pair of pulley wheels 32, which can be made of suitable insulating material, and which can be provided with suitable bearings 33 on the shafts 34. The pulleys and the associated parts of the contactor device are enclosed within a suitable housing 35 formed of suitable insulating material such as a molded phenolic condensate product. Preferably this housing is formed as two halves 35a and 35b, which are detachably retained together by being bolted to the ends of the shafts 34 (Figure 5).

In order to properly support the contacting device relative to the trolley wire and sheath, the housing carries upwardly extending members 36 and 37 which in turn carry the flanged wheels 38 and 39. These wheels are adapted to track upon the base portions of the strips 17 substantially as shown in Figure 4.

The end faces of a number of the teeth 30 normally engage and make electrical contact with the trolley wire 10, as shown in Figure 1. The base portions 30b of the teeth 30 are arranged to slide over and make electrical engagement with the bus bars 41. These bus bars are yieldably mounted within the housing 35 by novel means, whereby they are relatively uniformly and yieldably pressed against the base portions 30b of the teeth, to provide good electrical contact at all times without arcing. Thus medial portions of both bars are pivotally connected by pins 42 with the oppositely extending arms 43 of the L levers 44. L levers 44 are pivotallly carried by common pin 45, and are urged in opposite directions by the compression spring 46. Thus each of the bus bars 41 is yieldably urged upwardly against the base portions 30b of the teeth 30, and in addition each bus bar is free to rock about the axis of its pivot pin 42. The end extremities 47 of the bus bars are preferably tapered and reduced in width, in order that they may be loosely accommodated within the grooves of wheels 32.

Below the pivot pins 42 both bus conductors 41 are connected by the flexible stranded conductors 48 to the terminal strip 49. This strip in turn is shown connected to the terminal fitting 51 of the insulated conductor 52. It is this conductor which leads the current to the appliance being operated.

In order to minimize friction between the bus bars 41 and the teeth 30, the upper faces of the bus bars can be provided with cavities 53 (Figure 7) which can be filled with graphite or a like lubricating medium.

In order to facilitate traversing of the contacting device along the trolley wire, I can provide suitable means such as a bail 54 which can be pivotally attached to the ends of one of the shafts 34, and which in turn can connect to any suitable contrivance, such as the pull rod 56.

Operation of the equipment described above can be briefly outlined as follows: The assembly including the insulating sheath and the strips 17 is mounted in the position desired, and supported by the brackets 20. The contacting device 12 is tracked upon this assembly, with the wheels 38 and 39 engaging the base portions of the strips 17, substantially as shown in Figures 1 and 4. The upper rod of the endless contacting chain is disposed with its teeth entering the openings 15, substantially as shown in Figure 1, and with the end faces 30a of the teeth being pressed upon the exposed portions of the trolley wire. As shown in Figure 4 it is desirable that these end faces of the teeth 30 be provided with a substantially V-shaped groove in order to more adequately seat and center the same with respect to the trolley wire. In the device illustrated in the drawing a minimum of at least five teeth 30 are in continuous contact with the trolley wire. Furthermore all of these teeth are being yieldably urged against the trolley wire by the bus bars 41.

It will be noted in Figure 1 that the length of each opening 15 between the formed insulating teeth or ribs 14, is considerably greater than the length of the formed teeth 30. Also it will be noted that the tooth near the left hand end of Figure 1, which is about to be retracted from its associated opening 15, has its curved trailing face in abutting contact with the adjacent curved leading face of a rib 14. On the other hand the tooth appearing near the right hand end of Figure 4, which has just been advanced into its associated opening 15 to bear upon the trolley wire, has considerable clearance between both its leading and trailing faces and the adjacent faces of the teeth 14 preceding and behind the same. Between the two teeth 30 just mentioned, the intervening teeth appear in various intermediate positions, indicating that there is a substantial sliding movement between each tooth and the trolley wire, commencing with the instant the tooth engages the trolley wire, and ending with retraction. Such sliding movement makes for good electrical contact between the teeth and the conductor.

It will be evident from the above that my equipment is capable of application to a wide variety of services, including the various services where it is now common to make use of conventional exposed trolley wires, with conventional sliding shoes or trolley wheels. Relatively heavy currents can be taken off through my contacting device without arcing and without wear or pitting of the trolley wire. In general all parts of my equipment have a long useful life without undue wear, and thus expensive servicing such as is common with conventional arrangements, is reduced to a minimum. The work of installing the equipment is reduced to a minimum because of the simple and novel character of the insulating sheath and its mounting.

I claim:

1. In equipment of the character described, a contacting device adapted to make contact with a trolley wire comprising a pair of bus bars disposed in end to end relationship and adapted to move generally parallel to the trolley wire, an endless series of articulated conductor elements mounted for movement between the bus bars and the trolley wire to provide a conducting path therebetween, each bus bar being of a length sufficient for simultaneous engagement with a plurality of conductor elements, a pair of L levers, said L levers having oppositely extending arms, a common pivot pin for said L levers, pivotal connections between the extremities of said extending arms and intermediate portions of said bus bars, and spring means for urging said L levers in opposite directions to thereby yieldably urge the bus bars toward said trolley wire.

2. In a traveling contacting device adapted for use with an extended trolley wire having a sheath of insulating material, the sheath having openings for exposing portions of said wire, a pair of bus bars disposed in end to end relationship for movement parallel to and spaced from the trolley wire, an endless series of articulated conductor teeth for engaging and contacting the wire through the openings between the latter, each bus bar having a length sufficient for simultaneous engagement with a plurality of conductor teeth, a pair of spaced wheels on which the articulated teeth are tracked, the wheels being disposed adjacent the remote extremities of the bus bars, a pair of levers disposed between said wheels, a common pivot pin for said levers, means for pivotally attaching said levers to the bus bars at points intermediate the ends of the same, and spring means associated with said levers for yieldably urging the bus bars toward the trolley wire.

BURTIS WILLIAM BENBOW.

No references cited.